US006374704B1

(12) United States Patent
Scott et al.

(10) Patent No.: US 6,374,704 B1
(45) Date of Patent: *Apr. 23, 2002

(54) STEEL-TOOTH BIT WITH IMPROVED TOUGHNESS

(75) Inventors: Danny Eugene Scott, Montgomery; James Leslie Overstreet, Webster; Anton F. Zahradnik, Sugarland, all of TX (US)

(73) Assignee: Baker Hughes Incorporated, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/638,245

(22) Filed: Apr. 26, 1996

(51) Int. Cl.[7] .................................................. B21K 5/02
(52) U.S. Cl. ........................................ 76/108.2; 76/162
(58) Field of Search ............................. 76/108.1, 108.2, 76/108.4, DIG. 2; 384/95; 175/375, 410, 430; 148/525

(56) References Cited

U.S. PATENT DOCUMENTS

| 1,895,439 A | * | 6/1933 | Aubert et al. ......... 76/DIG. 2 X |
|---|---|---|---|
| 2,137,470 A | * | 11/1938 | Zublin .................... 76/108.1 X |
| 2,407,642 A | | 9/1946 | Ashworth ..................... 76/108 |
| 2,660,405 A | * | 11/1953 | Scott et al. ............. 76/108.1 X |
| 2,927,777 A | | 3/1960 | Steen ......................... 255/347 |
| 2,927,778 A | | 3/1960 | Coulter, Jr. ................. 255/349 |
| 3,003,370 A | | 10/1961 | Coulter, Jr. ................... 76/108 |
| 3,266,342 A | | 8/1966 | Coulter, Jr. et al. .......... 76/108 |
| 3,913,988 A | * | 10/1975 | Scales et al. ................. 384/95 |
| 3,923,348 A | * | 12/1975 | Peck ........................... 384/95 |
| 3,946,817 A | * | 3/1976 | Prince ........................ 175/374 |
| 4,276,946 A | * | 7/1981 | Millsapps, Jr. .............. 175/228 |
| 4,660,444 A | * | 4/1987 | Sorensen et al. ..... 76/DIG. 2 X |
| 4,683,781 A | * | 8/1987 | Kar et al. ................... 76/108.2 |
| 4,708,752 A | * | 11/1987 | Kar ............................. 148/525 |
| 4,726,432 A | * | 2/1988 | Scott et al. ................. 175/375 |
| 4,756,373 A | * | 7/1988 | Kane et al. ................. 175/430 |
| 4,867,015 A | * | 9/1989 | Kane et al. ................. 76/108.2 |
| 4,907,665 A | * | 3/1990 | Kar et al. ................... 175/426 |
| 4,969,378 A | * | 11/1990 | Lu et al. ............. 76/DIG. 2 X |
| 5,038,640 A | * | 8/1991 | Sullivan et al. ........ 76/108.2 X |
| 5,579,856 A | * | 12/1996 | Bird ...................... 76/108.4 X |

FOREIGN PATENT DOCUMENTS

GB 2211874 * 7/1989 ................ 76/108.1

* cited by examiner

Primary Examiner—Boyer Ashley
(74) Attorney, Agent, or Firm—Bracewell & Patterson L.L.P.

(57) ABSTRACT

An earth boring bit is shown having a bit body and at least one cutter rotatably secured to the bit body. The cutter has a plurality of teeth formed integrally thereon and arranged in circumferential rows. Each of the teeth includes an outer end, an inner end, a pair of flanks and a crest which transversely connects the ends and flanks. During the manufacturing process, a temporary protective coating is applied at a region of the tooth root which comprises a sharp corner at the intersection of the flanks and ends in order to prevent a carburized case from forming in that region during subsequent carburization of the cutter. The cutter is then carburized, heat treated and mounted on a bit body.

13 Claims, 3 Drawing Sheets

STEEL-TOOTH BIT WITH IMPROVED TOUGHNESS

BACKGROUND OF THE INVENTION

1. Field of the Invention

The present invention relates generally to the tooth structure of earth boring bits of the rolling cutter variety and, more specifically, to manufacturing techniques which add toughness to the areas of the teeth of steel-tooth bits which are most prone to cracking.

2. Description of the Prior Art

The success of rotary drilling enabled the discovery of deep oil and gas reservoirs. The rotary rock bit was an important invention that made that success possible. Only soft formations could be commercially penetrated with the earlier drag bit, but the original rolling-cone rock bit invented by Howard R. Hughes, U.S. Pat. No. 930,759, drilled the hard cap rock at the Spindletop Field, near Beaumont, Texas, with relative ease. Over the years, many individual advances have contributed to the impressive overall improvement in the performance of rock bits.

The early rolling-cone earth boring bits had teeth formed integrally with the cutters. These bits, commonly known as "steel-tooth" or "mill-tooth" bits, are still in common usage for penetrating relatively soft formations. The strength and fracture-toughness of the steel teeth permits relatively long teeth with long crests, which provide the aggressive gouging and scraping action that is advantageous for the rapid penetration of relatively soft formations.

However, it is rare that a formation interval will consist entirely of soft material with low compressive strength. Often, there are streaks of hard or abrasive materials that a steel-tooth bit must be able to penetrate economically, without damage to the bit.

Despite improvements which have occurred over the years, attention has again been recently focused on the development of earth-boring bits of the mill or steel-tooth variety because of advances in bearing and seal technology. During the manufacture of a typical steel-toothed cone for a rotary rock bit, the cone is first forged and the teeth are then machined in the desired shape and location. Next, the selected surfaces of each tooth are typically hard-faced. The wear-resistant materials or hardfacings which are utilized are conventional, and typically consist of particles of tungsten carbide or other hard metal dispersed in a steel or cobalt binder matrix. Such hardfacing materials are applied by melting the binder of the hardfacing material and applying the material over the surfaces of the tooth. Thereafter, the cutter is carburized to create a desired case depth. The cutter is then hardened and tempered.

Three rotatable cutters, so treated, are then typically assembled with the head section to form an earth boring drill bit. Steel teeth thus formed and subjected to a carburizing treatment develop a carbon penetration along the surface exposed to the treatment. The carbon penetrates into the steel and, it has been found, that such treatment tends to form an excess of carbon along the sharp corners, boundary lines and edges of the teeth. This undesirable concentration of carbides tends to make the teeth more brittle and more subject to fracture than the remainder the tooth surface. Cracking and breakage of the teeth of steel-tooth bits can thus be a problem, especially with the increased wear resistance of the hardfacing deposits, coupled with the longer service life of the bit.

A need exists, therefore, for an earth boring bit having a steel-tooth structure with improved toughness, particularly in the sharp corners of the teeth, near the base of each tooth.

SUMMARY OF THE INVENTION

It is, therefore, a general object of the present invention to provide an improved earth boring bit having an improved steel-tooth structure with added toughness in the area of each tooth which is most prone to cracking and brittleness.

This and other objects of the present invention are achieved by providing an earth boring bit having a bit body and at least one cutter rotatably secured to the bit body. The cutter has a plurality of teeth integrally formed thereon and arranged in circumferential rows. Each of the teeth includes a pair of ends, a pair of flanks, a crest transversely connecting the ends and flanks and a root, the roots of adjacent teeth being joined by a connecting region which defines a relatively sharp corner for the teeth adjacent the root thereof. The cutter has a generally uniform carburized case provided by a carburizing treatment during manufacture except at the sharp corners defined by the intersection of the flanks and ends of selected adjacent teeth of the cutter.

In the method of manufacturing the improved earth boring bit of the invention, a cutter body is formed having a plurality of teeth, each of the teeth having a pair of ends, a pair of opposing flanks, a crest transversely connecting the ends and flanks and a root, the roots of adjacent teeth being joined by a connecting region which defines a relatively sharp corner for the teeth. A temporary protective coating is applied to at least the sharp corners of selected teeth of the cutter. The temporary protective coating is effective to prevent the buildup of excess carbon in the sharp corner region of the selected teeth in a subsequent carburizing step. The cutter is then carburized to produce a carburized case therein, heat treated and mounted on a bit body.

The method can also include the step of applying a wear resistant material over the crest and a portion of the flanks and ends of at least selected teeth, the regions at the intersection of the flanks and ends of at least selected teeth being void of the wear resistant material. Preferably, the temporary protective coating is provided by a case preventative paint. The preferred wear resistant material is a tube hardfacing material. The case preventative paint can also be applied to the sharp corners and at least partly up a portion of the flanks and ends of adjacent teeth of the cutter prior to carburization.

Other objects, features and advantages of the present invention will become apparent to those having skill in the art with reference to the drawings and detailed description, which follow.

DETAILED DESCRIPTION OF THE INVENTION

Figure 1:
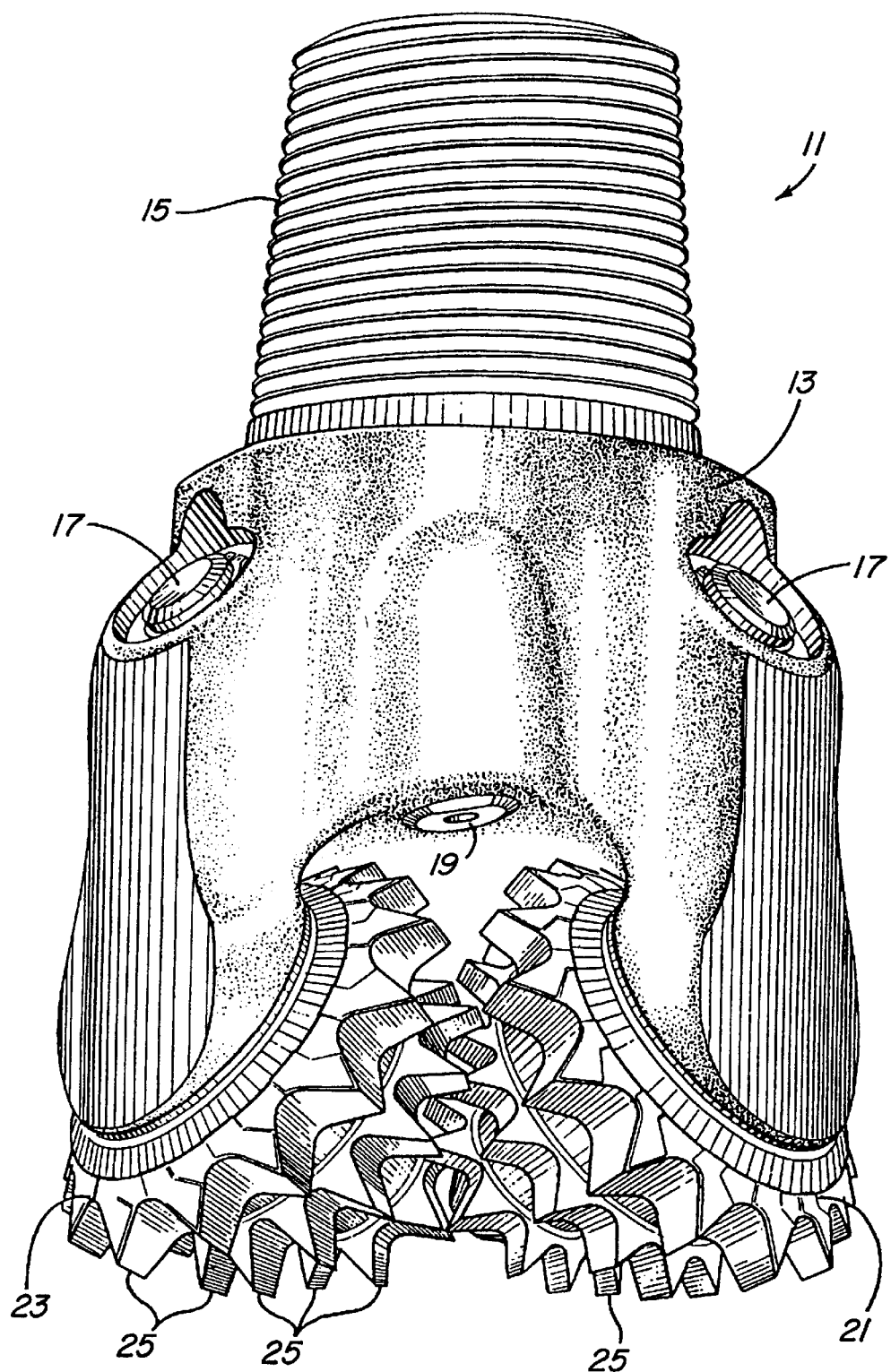
FIG. 1 is a perspective view of a steel tooth earth boring bit of the type contemplated by the present invention.

Referring now to FIG. 1, an earth boring bit 11 according to the present invention is depicted. Earth boring bit 11 includes a bit body 13 having threads 15 at its upper extent for connecting bit 11 into a drill string (not shown). Each leg of bit 11 is provided with a lubricant compensator 17, a preferred embodiment of which is disclosed in U.S. Pat. No. 4,276,946, Jul. 7, 1981, to Millsapps. At least one nozzle 19 is provided in bit body 13 for spraying cooling and lubricating drilling fluid from within the drill string to the bottom of the bore hole.

At least one cutter is rotatably secured to each leg of the bit body 13. Preferably three cutters 21, 23 (one cutter being obscured from view in the perspective view of FIG. 1) are rotatably secured to the bit body. A plurality of teeth 25 are arranged in generally circumferential rows on cutters 21, 23. Teeth 25 are integrally formed from the material of cutters 21, 23, which is usually steel.

Figure 2:
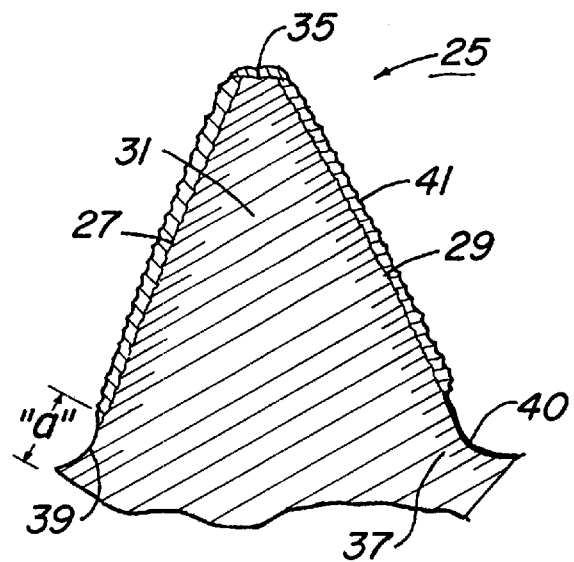
FIG. 2 is a fragmentary, section view of a hard-faced steel-tooth of the invention.

FIG. 2 is a fragmentary, sectional view of a single tooth of cutters 21, 23. Tooth 25 has a number of surfaces, including a pair of inclined flanks 27, 29, a pair of ends 31, 33 (FIG. 3), and a crest 35 substantially transversely connecting flanks 27, 29 and ends 31, 331. A layer 41 of wear-resistant material, commonly known as hardfacing, is provided over flanks 27, 29, ends 31, 33 and crest 35. Hardfacing layer 41 is provided to increase the hardness and wear resistance of tooth 25. As has been mentioned, harfacing materials are conventional in the art and generally consist of particles of tungsten carbide or other hard metal dispersed in a binder matrix of cobalt, steel, or an alloy thereof. Hardfacing materials, generally are applied by melting the binder and applying the hardfacing over tooth 25 using a gas torch.

Figure 3:
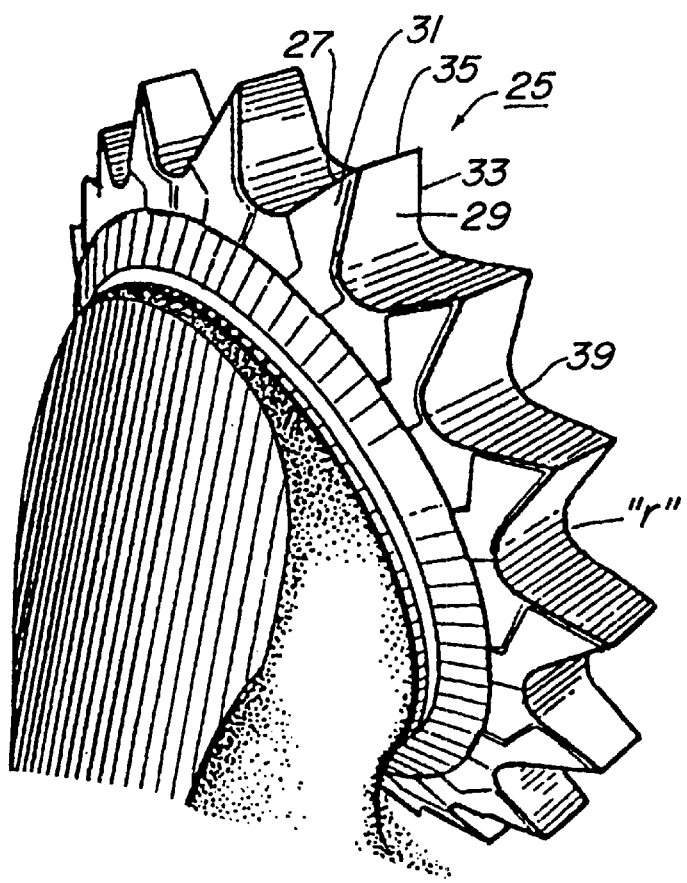
FIG. 3 is a close-up, broken away view of a portion of a bit body showing a cutter having steel teeth manufactured according to the method of the invention.
Figure 4:
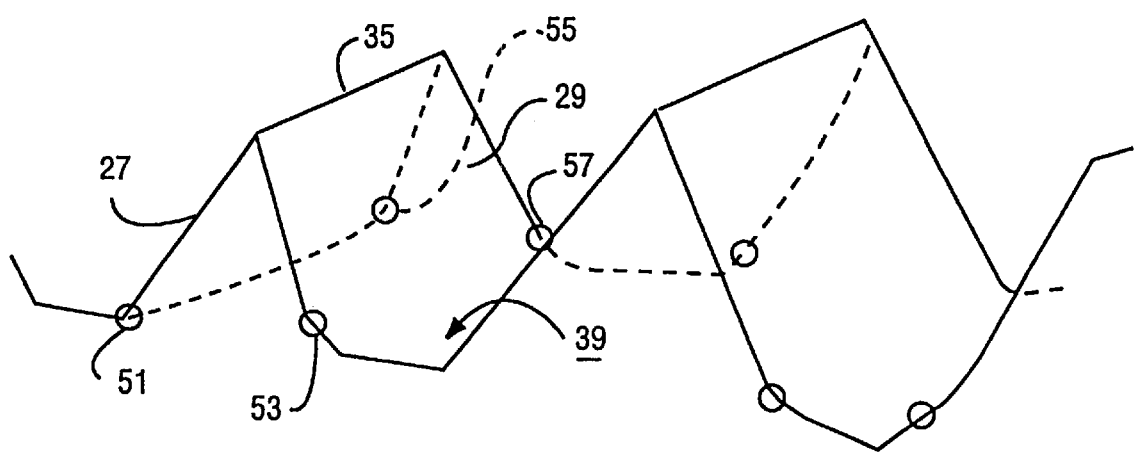
FIG. 4 is a simplified, schematic view of the sharp corners defined by the intersection of the flanks and ends of selected teeth of the bit of the invention.

As shown in FIG. 2, the roots 37 of adjacent teeth are joined by a "connecting region" 39 which defines a relatively sharp corner for the teeth, near the base or root of each tooth at the intersection of the flanks 27 and ends 31. As seen in FIGS. 3 and 4, each tooth in cross-section is generally pyramidal, having a polygonal base, the sides of which form triangular surfaces which meet at a common vertex defining the crest 35. The sharp corners, defined at the intersection of the flanks and ends of the teeth are illustrated as 51, 53, 55, 57 in FIG. 4 with the connecting region being generally illustrated as 39. As shown in FIGS. 2, 3 and 4, the connecting region 39 can be essentially "flat" but generally forms a radiussed region illustrated as "r" in FIG. 3. Note that the hardfacing 41 is applied over the majority of the tooth flanks 27, 29 as well as over the crest 35 and ends (31, 33 in FIG. 3) but that the hardfacing stops short of the radiussed, connecting region 39 at the tooth root and of the sharp corner regions 51, 53, 55, 57. Various carburizing techniques will be familiar to those skilled in the arts. Pack carburizing is described on pages 115–118 of Volume 2 of the 8th Edition of the Metals Handbook, "Heat Treating, Cleaning and Finishing" (American Society of Metals, 1964). Gas carburizing is described on pages 93–114 of the same reference. Gas carburizing is preferred for purposes of the present invention.

Figure 5:
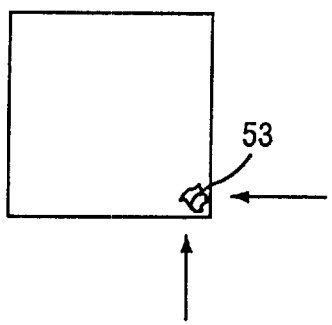
FIG. 5 is a schematic, cross-sectional view of a single tooth illustrating the intersection of the planes of the tooth which define the relatively sharp corners thereof.

As has been explained, the carburizing treatment which is applied after the application of the hardfacing 41 develops a carbon penetration along the exposed surfaces of the tooth. The carbon penetrates into the steel and tends to form an excess of carbon along any sharp corners, such as the corners 51, 53, 55, 57 in FIG. 4 and the corner 53 in FIG. 5. The formation of massive carbide deposits in these sharp corner regions tends to make the tooth more brittle and subject to fracture than the remainder of the tooth.

In order to prevent the buildup of undesirable carbides at the intersection of two surfaces of the cutter, such as the flank surface 29 and ends 31, a temporary protective coating is applied to at least the sharp corner regions 51, 53, 55, 57 of selected teeth of the cutter. The temporary protective coating is indicated by the darkened region 40 in FIG. 2. The temporary protective coating is effective to prevent the buildup of excess carbon in the sharp corner region of the teeth in a subsequent carburizing step. The cutters can then be carburized and heat treated, as is conventional in the art.

Preferably, the temporary protective coating is a case preventative paint also known as a "stop-off" paint, which will be familiar to those skilled in the art. A typical case preventative paint can be commercially obtained from a number of sources as a "Stop-Off Paint for Gas Carburizing Protection" and has as its primary ingredients sodium silicate, titanium dioxide and zirconium silicate with water as a solvent. Other commercially available paints use xylene as a solvent with other decarburizing chemical compositions.

As shown in FIG. 2, the temporary protective coating can be applied to the radiussed region 39 at the sharp corner and at least partly up a portion of the flanks 27, 29 to cover a portion of the tooth designated generally by the area "a" in FIG. 2. In other words, the temporary protective coating can be applied around the entire peripheral region of the base of each selected tooth, if desired. However, in the most preferred method of the invention, only the sharp corner regions 51, 53, 55, 57 are so treated. After carburizing, the cutters are hardened and tempered and then assembled with the head section to form an earth boring bit.

The following example is illustrative of the invention:

A steel-toothed cone is forged from a modified AISI 4815 steel containing about 3½% nickel and 0.35% molybdenum and containing approximately 0.15% carbon. The teeth are machined in the desired shape and location. Next, the flanks of each tooth in the cutter are hard-faced with a conventional tube hardfacing composition. Such hardfacing compositions typically contain tungsten carbide particles, the main particle size being generally in the range of about 0.030 to 0.050 inches. The tube wall is of low carbon steel and the carbide filling of the tube may include sufficient ferromolybdenum and ferromanganese powders to make a binder of pre-application composition of about 1% manganese, 0.25% molybdenum and the balance essentially low carbon steel. The raw material ratio is about 70 weight percent tungsten carbide and 30 weight percent binder and an oxyacetylene torch is used throughout. The melting point of the binder is around 2700° F.

After hardfacing, the case preventative paint is applied to the sharp corners of selected teeth. The cutter is then carburized to create a case depth of about 0.070 inches utilizing conventional gas carburizing techniques. The cutter is then hardened and tempered. The hardening is usually accomplished by quenching an oil, from a temperature of at least 1390° F., to produce a substantially martensitic case AISI 4815 steel. The tempering temperature is usually in the range of about 290 to 510° F., preferably about 330° F. for one hour, to toughen the carburized case without appreciably lowering its strength (hardness) to produce tempered martensite.

Three rotatable cutters treated in accordance with the forgoing example were assembled with head sections to form an earth boring drill bit 11. The bit 11 is connected by threads 15 into a drill string (not shown). The drill string and bit 11 are then rotated, whereby cutters 21, 23 roll and slide over the bottom of the bore hole. As cutters 21, 23 roll and slide over the bottom of the bore hole, teeth 25 gouge and scrap formation material, resulting in penetration of the formation. Drilling fluid from within the drill string exits nozzle 19, cooling and lubricating cutters 21, 23 and lifting fragments of formation material away from the bottom of the bore hole.

The improved steel-tooth bits of the invention exhibit improved toughness with reduced cracking and breakage of the teeth, especially at the relatively sharp corners near the base of the teeth. The use of a temporary protective coating during the manufacturing process prior to carburization prevents the formation of undesirable carbides in the grain boundaries which previously led to a very brittle condition. By preventing a carburized case in the sharp corner regions at the teeth roots, these areas which are most prone to cracking are toughened considerably. The use of a case preventative or stop-off paint in at least the sharp corner regions at the base or root of each tooth removes the high gradient and grain boundary precipitates which previously lead to cracking and breakage of steel teeth.

While the invention has been shown in only one of its forms, it is not thus limited but is susceptible to various changes and modifications without departing from the spirit thereof.

What is claimed is:

1. The method of manufacturing a cutter for an earth boring drill bit, the method comprising the steps of:

forming a cutter body having a plurality of teeth, each of the teeth having a pair of ends, a pair of opposing flanks, a crest transversely connecting the ends and the flanks, and a root, the roots of the teeth adjacent one another being joined by a connecting region which defines a relatively sharp corner on each tooth adjacent the root of the tooth;

forming a relatively softer area on a region of at least selected teeth by applying a temporary protective coating to only selective regions of each selected tooth, thereby forming intentional wear areas on each selected tooth, the selective regions comprising the sharp corners of selected adjacent teeth of the cutter, the temporary protective coating being effective to prevent buildup of excess carbon at the sharp corners of the teeth in a subsequent carburizing step; and case-hardening the cutters to produce a hardened case therein, the selective tooth regions having the protective coating applied thereto having the additional effect of forming a relatively softer area which will intentionally wear away during use.

2. The method of claim 1, wherein the method also includes the step of application a wear resistant material over the crest and a portion of the flanks and the ends of the teeth, the connecting regions being void of wear resistant material.

3. The method of claim 2, wherein the temporary protective coating is application by painting with a case preventive paint.

4. The method of claim 3, wherein the resistant material is applied by welding a tube hardfacing material.

5. A method of manufacturing an earth boring drill bit having rotatable cutters, the method comprising the steps of:

forming a cutter having a plurality of teeth, each of the teeth having a pair of ends, a pair of opposing flanks, a crest transversely connecting the ends and the flanks, and a root, the roots of the teeth adjacent one another being joined by a radiussed connecting region which defines a relatively sharp corner on the teeth adjacent the root and at intersections of the flanks and the ends;

forming a relatively softer area on a region of at least selected teeth by applying a temporary protective coating to only selective regions of each selected tooth, thereby forming intentional wear areas on each selected tooth, the selective regions comprising the radiussed region at the sharp corners of selected teeth of the cutter, the temporary protective coating being effective to prevent a buildup of excess carbon in the sharp corners of the teeth in a subsequent carburizing step;

case-hardening the cutter to produce a hardened case therein, the selective tooth regions having the protective coating applied thereto having the additional effect of forming a relatively softer area which will intentionally wear away during use;

heat treating the cutter; and mounting the cutter on a bit body.

6. The method of claim 5, wherein the method also includes the step of applying a wear resistant material over the crest and a portion of the flanks and the end of the teeth, the sharp corners being void of wear resistant material.

7. The method of claim 6, wherein the temporary protective coating is applied by painting with a case preventive paint.

8. The method of claim 7, wherein the wear resistant material is applied by welding a tube hardfacing material.

9. The method of claim 8, wherein the case preventative paint is applied to the sharp corners and at least partly up a portion of the flanks and the ends of adjacent teeth of the cutter.

10. A method of manufacturing an earth boring drill bit having rotatable cutters, the method comprising the steps of:

providing a cutter having a plurality of teeth, each of the teeth having a pair of ends, a pair of opposing flanks, a crest transversely connecting the ends and flanks, and a root, intersections of the ends and the flanks defining sharp corners extending generally from the root to the crest of each tooth; then applying a wear resistant material over the crest and a portion of the flanks and ends of selected teeth, the sharp corners at the roots being void of wear resistant material; then forming a relatively softer area on a region of at least selected teeth by applying a temporary protective coating to only selective regions of each selected tooth, thereby forming intentional wear areas on each selected tooth the selective, regions comprising the sharp corners of selected teeth of the cutter, the temporary protective coating being effective to prevent the buildup of excess carbon in the sharp corners of the selected teeth in a subsequent carburizing step; then carburizing the cutter to produce a carburized case therein, the selective regions having the protective coating applied thereto having the additional effect of forming a relatively softer area which will intentionally wear away during use; then heat treating the cutter; and then mounting the cutter on a bit body.

11. The method of claim 10, wherein the temporary protective coating is applied by painting with a case preventative paint.

12. The method of claim 10, wherein the step of applying the wear resistant material comprises welding a tube hardfacing material.

13. The method of claim 10, wherein the step of applying the temporary protective coating comprises:

painting the sharp corners and at least partly up a portion of the flanks and ends of adjacent teeth of the cutter with a case preventative paint.

* * * * *

UNITED STATES PATENT AND TRADEMARK OFFICE
CERTIFICATE OF CORRECTION

PATENT NO.    : 6,374,704 B1
DATED         : April 23, 2002
INVENTOR(S)   : Scott et al.

It is certified that error appears in the above-identified patent and that said Letters Patent is hereby corrected as shown below:

Title page,
Item [*] Notice, delete "0" and insert -- 547 --.

Signed and Sealed this

First Day of July, 2003

JAMES E. ROGAN
*Director of the United States Patent and Trademark Office*